United States Patent
Charpak et al.

[11] Patent Number: 6,133,575
[45] Date of Patent: Oct. 17, 2000

[54] HIGH-RESOLUTION POSITION DETECTOR FOR HIGH-FLUX IONIZING PARTICLE STREAMS

[75] Inventors: Georges Charpak, Paris; Ioannis Giomataris, Versailles; Philippe Rebourgeard, Paris; Jean-Pierre Robert, Igny, all of France

[73] Assignee: Biospace Instruments, Paris, France

[21] Appl. No.: 09/051,299

[22] PCT Filed: Oct. 10, 1996

[86] PCT No.: PCT/FR96/01576

§ 371 Date: Jul. 16, 1998

§ 102(e) Date: Jul. 16, 1998

[87] PCT Pub. No.: WO97/14173

PCT Pub. Date: Apr. 17, 1997

[30] Foreign Application Priority Data

Oct. 11, 1995 [FR] France .................................. 95 11928

[51] Int. Cl.[7] .................................................. G01T 1/185
[52] U.S. Cl. .......................................... 250/385.1; 250/374
[58] Field of Search ................................. 250/374, 385.1

[56] References Cited

U.S. PATENT DOCUMENTS 5,223,717 6/1993 Charpak ................................. 250/385.1
5,308,987 5/1994 Wuest et al. .
5,596,201 1/1997 Charpak ................................. 250/385.1

OTHER PUBLICATIONS

Nuclear Instruments & Methods in Physics Research, Section—A: Accelerators, Spectrometers, Detectors and Associated Equipment, vol. 274, No. 1–2, Jan. 1, 1989, Amsterdam NL, pp. 275–290, XP000121570 G. Charpak et al.: "Gaseous detectors with parallel electrodes and anode mesh planes," cite dans la demande voir p. 280 –p. 281; figure 10.

*Primary Examiner*—Constantine Hannaher
*Assistant Examiner*—Andrew Israel
*Attorney, Agent, or Firm*—Burns Doane Swecker & Mathis, L.L.P.

[57] ABSTRACT

This detector comprises a gas chamber (2) containing plane electrodes (4, 6, 8) delimiting conversion (C) and amplification (A) gaps. One of the electrodes is perforated with holes (18) and forms the detector cathode (6). The distance between the detector cathode and the anode (8) is less than 500 $\mu$m. The intensity of the electric field in the amplification gap is ten times higher than the intensity of the electric field in the conversion gap. Application in particle physics, medicine, biology.

12 Claims, 4 Drawing Sheets

HIGH-RESOLUTION POSITION DETECTOR FOR HIGH-FLUX IONIZING PARTICLE STREAMS

DESCRIPTION

1. Technical Field

This invention relates to an ionizing particle detector.

It is applicable particularly in particle physics, and in medicine and biology, in the fields of β ray imagery and X ray imagery.

2. State of the Prior Art

Document (1) G. CHARPAK et al., "Gaseous detectors with parallel electrodes and anode mesh planes", Nuclear Instruments and Methods in Physics Research A274 (1989), p. 275 to 290, describes an ionizing particle detector comprising a cathode consisting of a grid formed of woven wires with a mesh size of the order of 600 µm.

Consequently, the cathode and anode of the detector must be spaced by several millimeters to avoid an excessive fluctuation of the gain in the amplification gap between the anode and the cathode.

The large distance between these two elements limits the spatial resolution and the count rate of this detector.

With this distance between the cathode and the anode in this known detector, the time necessary for collection at the cathode of ions generated by an avalanche process in the amplification gap is relatively long.

Furthermore, this relatively long collection time means that electrical signals are collected at the detector anode with a relatively long rise time, causing stacking problems in electronic processing means for these signals.

DESCRIPTION OF THE INVENTION

This invention relates to an ionizing particle detector with a spatial resolution significantly higher than the known detector mentioned above, and capable of detecting ionizing particle flows significantly higher than this known detector.

More precisely, the purpose of this invention is an ionizing particle detector, this detector comprising:

a gas chamber, first, second and third plane electrodes placed in this order in the chamber and kept parallel with each other, the first and second electrodes delimiting a conversion gap in which particles generate electrons, the second and third electrodes delimiting an amplification gap in which these electrons are multiplied by an avalanche process, the second electrode being perforated by holes and forming a cathode, the third electrode forming an anode and comprising a set of elementary anodes electrically insulated from each other, and polarization means capable of raising the first electrode to a first potential, the cathode to a second potential higher than the first potential, and elementary anodes to a third potential higher than the second potential, these polarization means thus being capable of creating electric fields in the conversion and amplification gaps respectively, wherein the distance D between the cathode and the anode is less than 500 µm and the ratio R of the intensity of the electric field created in the amplification gap to the intensity of the electric field created in the conversion gap exceeding 10 and wherein the detector further comprises means for amplifying and processing electric signals from the elementary anodes when the electrons are multiplied in the amplification gap.

As we will see better later, the use of a short distance of less than 500 µm between the cathode and anode of the detector according to the invention makes it possible to have this detector elementary anodes with a size approximately equal to or less than this distance, so that a very high spatial resolution can be achieved.

Furthermore, the ratio between the intensities of the electric fields mentioned previously is significantly higher in this invention than it is in the known detector mentioned above.

As we will see better later, this enables detection of significantly higher particle flows than is possible using this known detector.

Preferably, the distance D between the cathode and the anode of the detector according to the invention does not exceed 200 µm.

The spatial resolution that can be achieved with this detector is higher when this distance D is low.

Also preferably, the ratio R between the electric field intensities is equal to at least 50.

As we will see better later, this means that very high ionizing particle flows can be detected.

According to one preferred embodiment of the detector according to the invention, the thickness E of the cathode is less than D/10.

This gives good uniformity of the gain in the amplification gap of the detector and facilitates passage of electrons from the conversion gap to this amplification gap.

Preferably, the size T of the holes in the cathode and the pitch P of these holes are within the interval between D/10 and D/7, this size T being greater than the thickness E and less than the pitch P.

This gives an electric field with good uniformity in the amplification gap and therefore also contributes to good uniformity of the gain in this amplification gap.

According to a first specific embodiment of the detector according to the invention, the elementary anodes are electrically conducting strips parallel to each other.

According to a second particular embodiment, the elementary anodes are electrically conducting elements forming a two-dimensional checker board network.

According to a third specific embodiment, the elementary anodes are distributed into a first set of electrically conducting strips parallel to each other and into a second set of electrically conducting strips parallel to each other, perpendicular to the strips in the first set and electrically insulated from them.

Electrically insulating spacers can be used to keep the anode and the cathode parallel to each other.

The gas pressure in the chamber of the detector according to the invention may exceed $10^3$ Pa to generate a significant quantity of electrons in the conversion gap of this detector, due to ionization of the gas by particles.

As a variant, the gas pressure in the chamber is very much less than $10^3$ Pa, and furthermore the detector is provided with a layer of a material capable of generating electrons in the conversion gap by interaction with ionizing particles, this layer being formed on the first electrode facing the detector cathode.

BRIEF DESCRIPTION OF THE DRAWINGS

This invention will be better understood after reading the description of example embodiments given below, which are given purely for guidance and are in no way restrictive, referring to the attached drawings in which.

DETAILED DESCRIPTION OF PARTICULAR EMBODIMENTS

Figure 1:
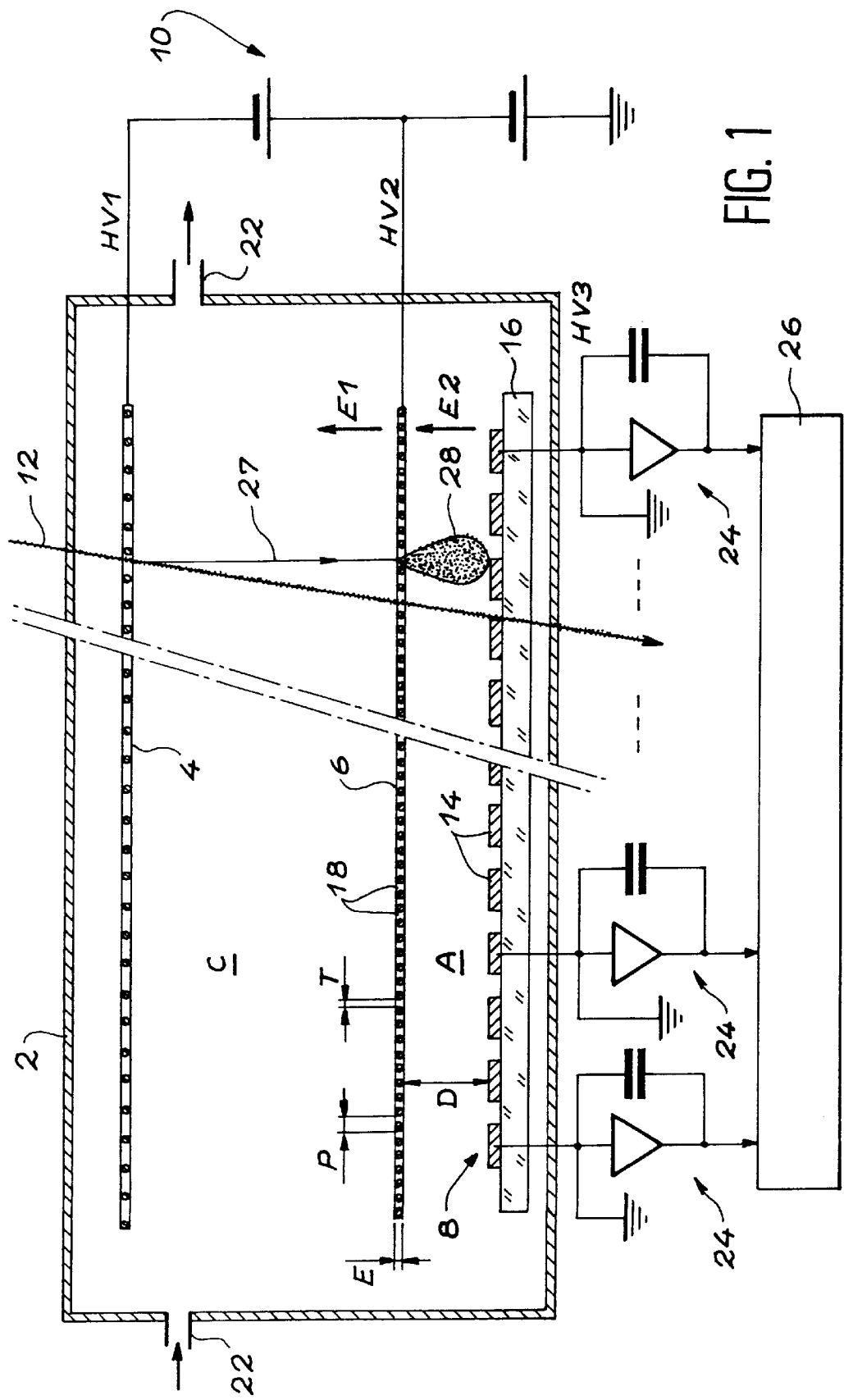
FIG. 1 is a schematic sectional view of a particular embodiment of the detector according to the invention.

The detector according to the invention, which is shown schematically in FIG. 1, comprises:

a gas chamber 2, three plane electrodes 4, 6 and 8 contained in chamber 2, which are parallel to each other, and polarization means 10 for these electrodes.

When ionizing particles to be detected, such as the particle for which the trajectory is shown by arrow 12, pass through a chamber 2, they meet electrode 4, electrode 6 and then electrode 8 in turn.

Electrode 6 forms the detector cathode, whereas electrode 8 forms the anode of this detector.

Electrode 4, for which the structure is not important (for example it may be a grid), and cathode 6 of the detector in FIG. 1 delimit a gap C called the "conversion gap", the function of which will be described later.

Cathode 6 and anode 8 of the detector delimit a gap A called the "amplification gap", the functions of which will also be described later.

The detector anode 8 comprises a set of elementary anodes 14 formed on an electrically insulating support 16, and spaced from each other.

In the example shown in FIG. 1, these elementary anodes are electrically conducting strips parallel to each other (seen in sectional view in FIG. 1).

Cathode 6 of the detector in FIG. 1 is a thin electrically conducting plate, perforated by small holes 18, this cathode 6 thus forming a grid which, due to the small size of its holes, may be called a "micro-grid".

The polarization means 10 are capable of increasing electrode 4 to a potential HV1, the cathode 6 to a potential HV2 exceeding HV1 and all conducting strips 14 to the same potential HV3 exceeding HV2.

In the example shown in FIG. 1, these conducting strips 14 are connected to the ground, the two potentials HV1 and HV2 both being negative.

The polarization means 10 can thus create electric fields E1 and E2 in the conversion gap C and in the amplification gap A respectively.

According to this invention, the distance D between the cathode 6 and the plane of the conducting strips 14 is small.

In the example shown, the distance D is equal to 100 μm.

The distance between the electrode 4 and the cathode 6 is much larger, and is equal to 3 mm in the example shown.

Furthermore, the ratio R between the intensity of the electric field E2 created in the amplification gap A to the intensity of the electric field E1 created in the conversion gap C is very large, and is at last equal to 50.

In the example shown in FIG. 1, the polarization means 10 generate a field equal to 100 kV/cm in the amplification gap and a field equal to 1 kV/cm in the conversion gap, such that this ratio R is equal to 100.

In the detector shown in FIG. 1, the conducting strips 14 are 150 μm wide and 5 μm thick copper micro-tracks protected by a thin layer of gold and obtained by appropriate deposits on the insulating substrate 16, these micro-tracks being at a spacing of 200 μm from each other.

Denoting the thickness of the micro-grid 6, the size of the holes 18 in this micro-grid and the pitch of these holes as E, T and P respectively, these parameters E, T and P satisfy the following relations with the distance D between the anode and the cathode of the detector in FIG. 1:

$$E < D/10 < T \leq P < D/7.$$

In the example shown in FIG. 1, the micro-grid 6 is electroformed and its thickness E is equal to 3 μm, whereas the size and pitch of these holes are equal to 8 μm and 10 μm respectively.

Considering the short distance between the detector anode and cathode, the conditions imposed on these parameters can give a significantly constant gain in the amplification gap A, and a significantly uniform field E2 in this gap A, as will be seen better later.

The gain is equal to the number of secondary electrodes produced in an avalanche (in other words for a primary electron).

Figure 2:
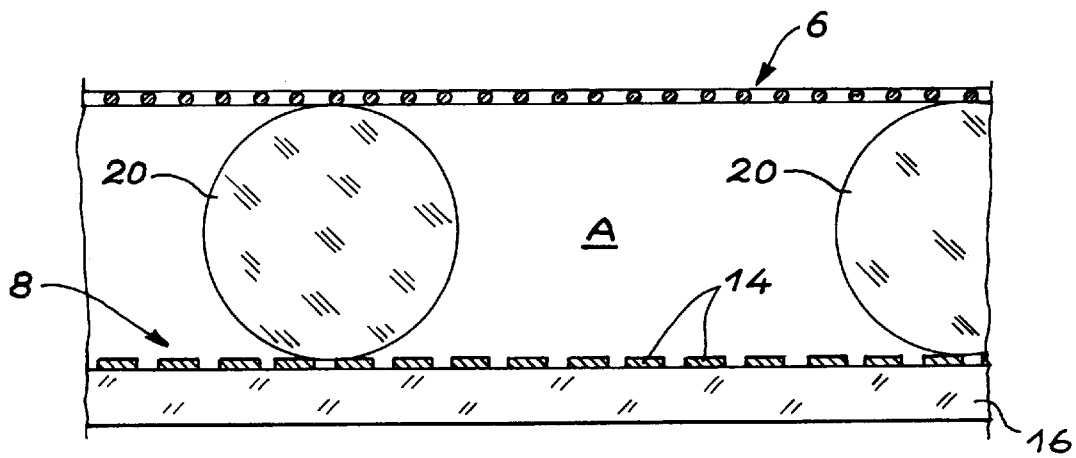
FIG. 2 is a schematic and partial sectional view of the detector in FIG. 1, showing the spacers used in this detector.

Electrically insulating spacers 20 are used (FIG. 2) in order to prevent electrostatic forces from moving the cathode 6 and the anode 8 closer to each other, and therefore to maintain this cathode and this anode parallel to each other.

In the example shown, these spacers 20 are small 100 μm diameter quartz wires at a spacing of 1 cm from each other.

The detector chamber 2 in FIG. 1 is provided with means 22 of circulating an appropriate gas, for example a mixture of argon and methane (with 90% argon and 10% methane).

As will be seen better later, this gas enables amplification of electrons by an avalanche process.

The pressure in the gas that fills the conversion gap and the amplification gap is high, and for example may be equal to $10^5$ Pa.

In an example not shown, the gas does not pass through the chamber 2, but this chamber 2 is initially filled with gas at the required pressure.

Each of the conducting strips 14 is connected to a fast amplifier 24 that amplifies electric signals collected by this strip.

Furthermore, the detector in FIG. 1 is provided with means 26 of processing the signals supplied by these fast amplifiers 24.

The operation of the detector in FIG. 1 is described below.

When an ionizing particle passes through chamber 2, it ionizes the gas located in the conversion gap C and creates about 10 primary electrons in it.

Under the effect of the electric field that exists in this gap, the electrons thus created by ionization move towards cathode 6.

Arrow 27 shows the trajectory of one of these electrons in FIG. 1.

These then pass through the openings formed in the cathode and move towards the anode 8.

This crossing through the cathode is facilitated by the high ratio between the field created in the conversion gap and the field created in the amplification gap.

After passing through the cathode 6, these electrons are amplified by means of the high field that exists in the amplification gap, using the well known avalanche process.

FIG. 1 shows the avalanche reference 28 associated with the electron, the trajectory of which is marked as reference 27.

Details of operation of this detector shown in FIG. 1 will be described later, but we now state that gains of the order of $10^4$ are easily obtained in the amplification gap without causing any sparks between the detector anode and the cathode.

For example, with an X ray source of 5.9 keV produced by disintegration of $^{55}$Fe, this detector can give pulses with an energy resolution of close to 25% as in conventional wire chambers, with gains of the order of $10^4$, or even more than this value.

There is no limit for choosing the material used to make the substrate on which the conducting strips 14 are placed, or for choosing the thickness of this substrate.

Many inexpensive techniques can be used to form these conducting strips and connect them to fast amplifiers associated with them.

It is thus possible to make an easy to use detector according to the invention, with good transparency to ionizing particles to be detected.

These advantages are capital in the medical field, and in high energy and nuclear physics.

The structure of the detector shown in FIG. 1 leads to performances unknown in previous detectors.

Thus in particle physics, due to the very short distance between the anode and the cathode in a detector of the type shown in FIG. 1, the positive ions produced during the avalanche process in the amplification gap are collected by the detector cathode in less than 100 ns.

Consequently, the appearance of a gap charge introduced by these ions can be avoided, so that count rates of greater than about $10^6$ counts/s/mm$^2$ can be obtained.

Note that in a conventional wire chamber, the time to "scan" positive ions may reach a few tens of micro-seconds, such that count rates are limited to values at least 100 times lower than what can be obtained using a detector according to the invention.

Since the conducting strips 14 are at the same potential, a very small interval can be left between these strips, as little as 5 to 10% of their width.

This thus avoids the problem of charges being deposited on the insulating substrate 16 that supports these strips 14.

Note that all this is very different from what exists in a "micro-strip gas chamber" type detector in which the amplification is achieved by means of an electric field generated between narrow and adjacent conducting strips formed on an electrically insulating substrate.

In the latter case, it is necessary to allow a fairly large distance between the strips so that a high voltage can be applied between them.

This causes considerable problems due to the positive charges that are then deposited on the insulating substrate.

In this case, the conducting strips 14 are at the same potential such that the distance between two adjacent strips may be arbitrarily small and depend only on the technology used to make these strips.

Figure 3:
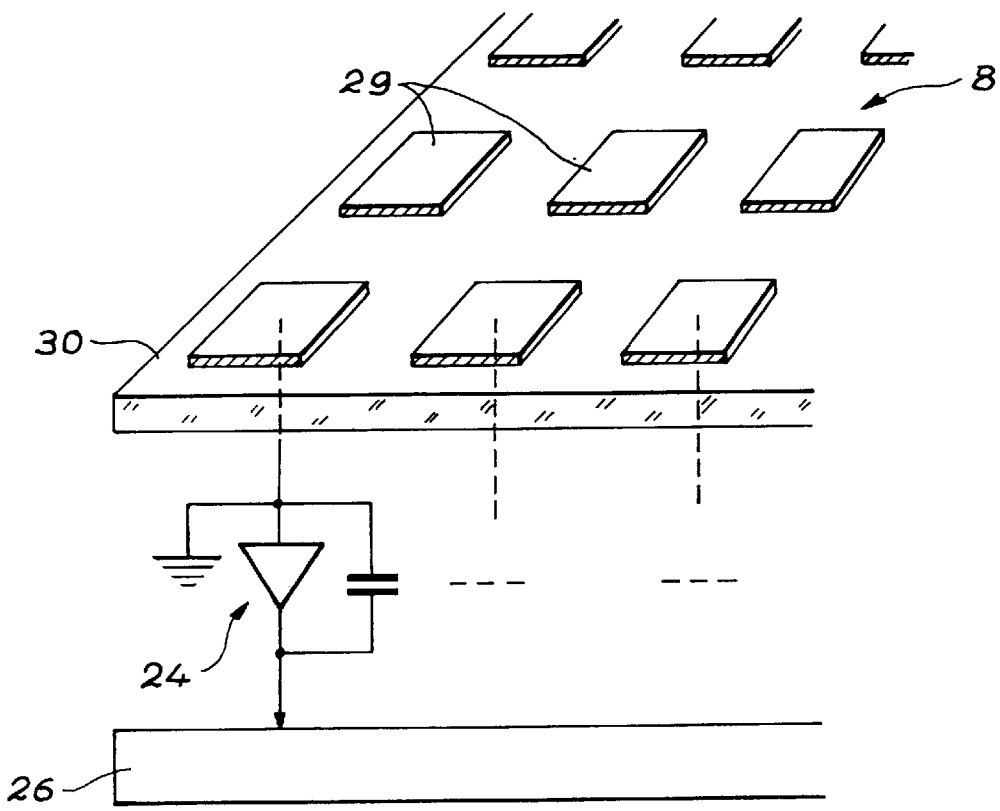
FIG. 3 is a schematic perspective view of a checker board anode usable in this invention.

Note also that the shape of the elementary anodes referred to above, and which are composed of conducting strips 14 in the case shown in FIG. 1, is not at all critical, and it is equally possible according to the invention to make a detector with conducting strips, or a detector in which the elementary anodes are thin electrically conducting elements 29 (FIG. 3) forming a two-dimensional checker board network on an electrically insulating plane substrate 30.

As before, these elements 29 are connected to fast amplifiers 24 themselves connected to electronic processing means 26.

Other structures will be possible for anode 8 depending on the application for which the detector is designed.

Other detectors conform with the invention can be made enabling two-dimensional "readout" of avalanches.

Figure 4:
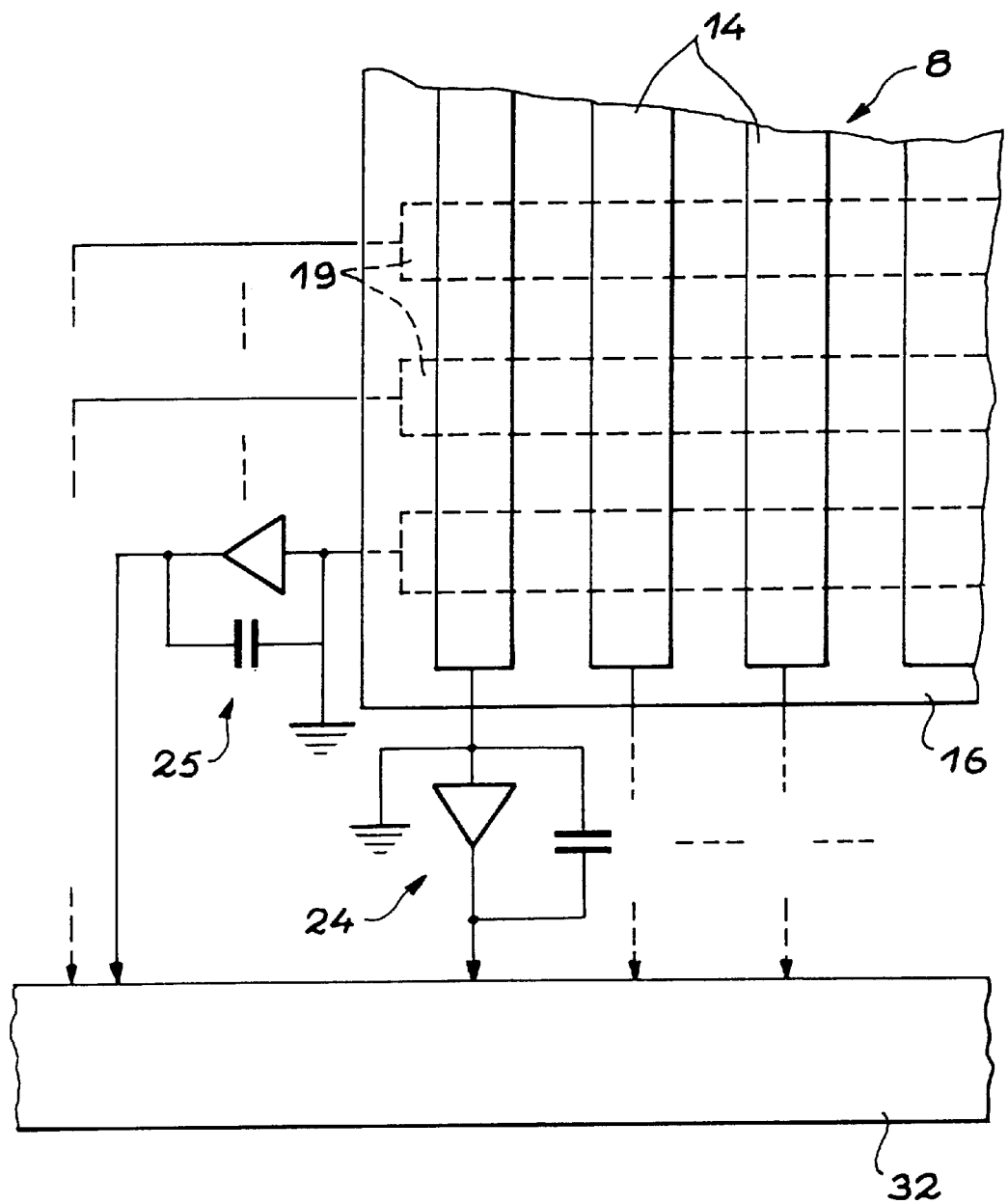
FIG. 4 is a schematic top view of an anode that can be used in this invention enabling two-dimensional reading of avalanches generated in the amplification gap.

An example of this type of detectors is illustrated schematically in FIG. 4.

In the detector in FIG. 4, the anode 8 comprises all parallel conducting strips 14 formed on one surface of the electrically insulating substrate 16, and also another set of parallel conducting strips 19 formed on the other surface of this substrate 16 and perpendicular to the strips 14.

The strips 14 are again facing the cathode of the detector (not shown in FIG. 4).

The conducting strips 19 are all at the same potential (they are connected to the ground in the example shown), and are connected to fast amplifiers 25 respectively, which like the fast amplifiers 24 associated with strips 14, are connected to means 32 for processing the signals output by these amplifiers 24 and 25.

A sufficient distance is provided between the strips 14 such that electrical pulses generated in these strips 14 can be induced on the other strips 19.

When it is required to detect high count rates, there is no problem in covering the strips 14 with a thin resistive deposit, for example made of germanium.

This deposit allows induced signals to pass and, since all the strips are at the same potential, the high resistivity of this deposit does not induce any coupling between these strips.

Figure 5:
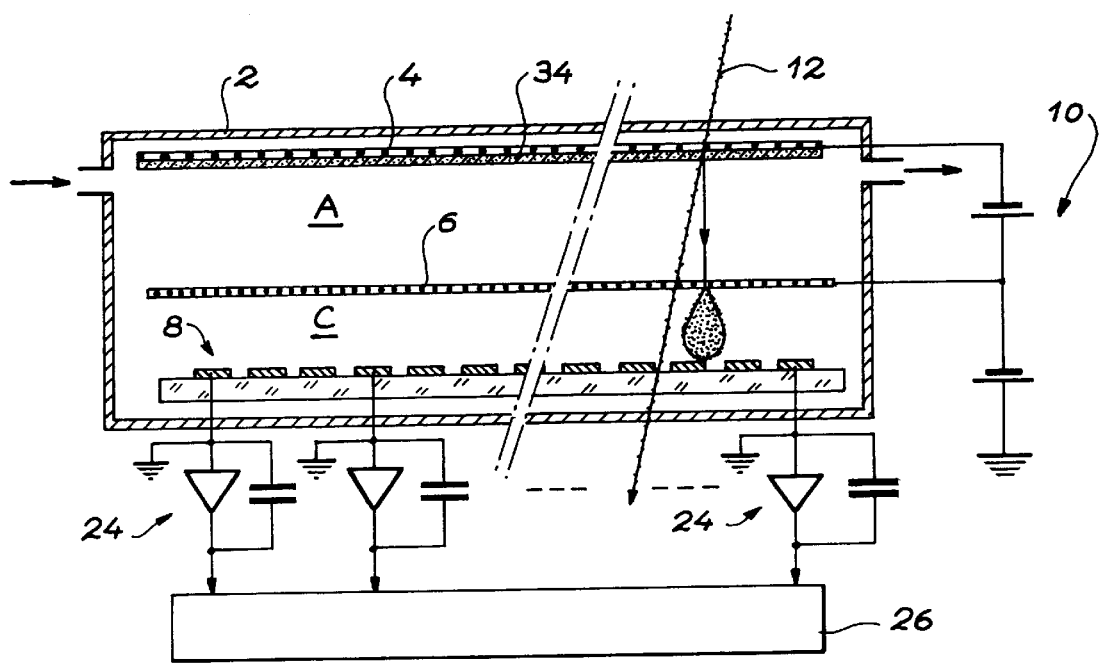
FIG. 5 is a schematic view of another detector according to the invention, including a layer with secondary emission of electrons.

Another detector according to the invention is illustrated schematically in FIG. 5.

This detector in FIG. 5 only differs from the detector in FIG. 1 in the following respects:

the electrode 4 is much closer to cathode 6 in the case shown in FIG. 5 (their distance is of the order of a few hundred micrometers), on the surface facing cathode 6, electrode 4 is covered by a layer 34 of a material capable of generating electrons by interaction with the ionizing particles to be detected, and the pressure in the detector chamber 2 shown in FIG. 5 is kept at a value less than the existing value in the detector in FIG. 1: the pressure is of the order of a few hundred Pa in the case shown in FIG. 5.

Therefore, this is a low pressure detector.

This invention is very useful in making this type of detector.

With this detector, time resolutions of a few tens of picoseconds can be achieved.

The invention also finds applications in the medical field, and in the biology field.

In particular it is applicable to the β ray imagery field.

A number of gaseous detectors with wires or with parallel surfaces are known in this field, designed to localize β rays.

In all these known detectors, there is the problem of the long path of the β rays in the gas, which limits the resolution of these known detectors.

This problem is solved for most applications with a detector according to the invention including a narrow conversion gap of the order of 200 μm followed by an amplification gap with a width of about 100 μm.

The result is a spatial resolution equal to a fraction of the total thickness of the detector, or typically of the order of 50 micrometers.

The invention is also applicable particularly to the X ray imagery field.

A known detector described in the following document is also applicable to this field:

(2) French patent application No. 9302817, Mar. 11, 1993 (see also European patent application No. 94 400 501.6, Mar. 8, 1994)

However, a detector according to this invention has the advantage over this known detector in that it is easier to make due to the lack of wires, it enables higher count rates and its localization precision is better due to the small distances possible between the conducting strips of the anode in this detector according to the invention.

We will now consider the operation and advantages of a detector according to the invention.

Note that the highly asymmetric configuration of the electrodes in this type of detector means that operation is very different from known detectors and results in performances never achieved by these detectors.

In this detector according to the invention, the electron multiplication process takes place solely in the amplification gap between the anode and the cathode, under the effect of the high electric field existing in this gap and the size of the avalanche created is of the same order of magnitude as the distance between the anode and the cathode (100 µm in the example shown in FIG. 1).

Therefore, it is possible to use conducting strips or elements in the checker board with a width of the order of 100 µm or less, and achieve a spatial resolution of few tens of micrometers.

Furthermore, the use of grids in known detectors reduces their efficiency.

In a detector according to the invention, the ratio R between the intensities of these fields is very high and may be equal to 100 or more than 100.

Figure 6:
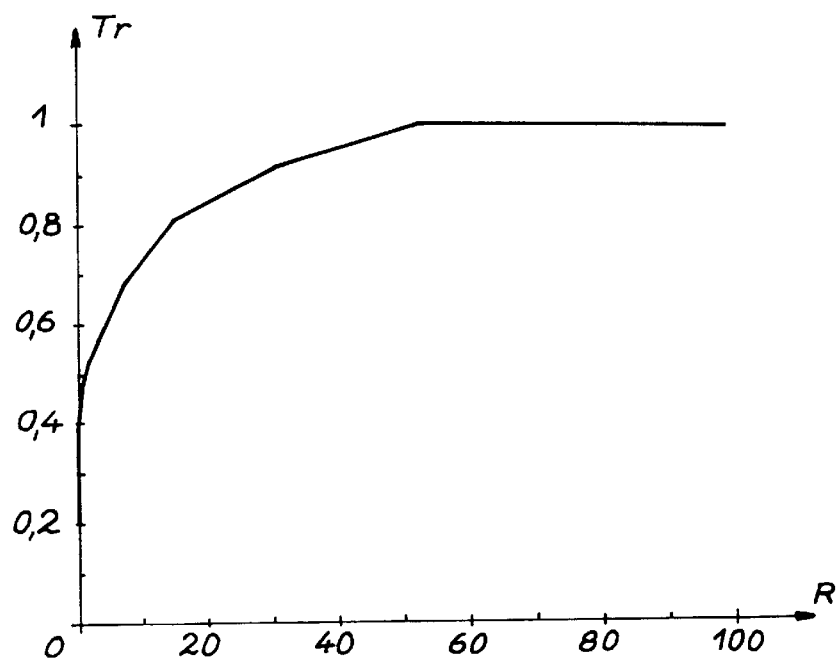
FIG. 6 represents variations of the transmission from the cathode of a detector according to the invention as a function of the ratio of the intensity of the electric field created in the amplification gap to the intensity of the electric field created in the conversion gap in this detector.

This can give an electron collection efficiency of close to 100%, as shown in FIG. 6 which shows the curve of variations of the transmission Tr from the grid shaped cathode used in the detector according to the invention, as a function of this ratio R.

It can be seen that for values of this ratio of less than 10, the transparency of this grid is less than 75%, but that it becomes total (100%) as soon as the ratio is approximately 50.

Note that this effect is accentuated for grids with finer meshes or modest optical transparencies since the values of the ratio R necessary to achieve full efficiency must be even higher, and these values can easily be obtained with a detector according to the invention.

Furthermore, unlike these electrons, positive ions created during the electron multiplication process are subject to an extremely low field ratio which is exactly the opposite of the field ratio "experienced" by the electrons and which prevents these ions from passing through the grid.

Therefore, the vast majority of these ions will be collected on this grid within a very short time interval of the order of 100 ns.

This fast evacuation of ions can give very high count rates.

Furthermore, in a detector of the type shown in FIG. 1, the signals collected by the conducting strips 14 are mainly due to ion movements in the amplification gap: these signals are induced when these ions are collected by the grid shaped cathode 6.

By using the 150 µm wide conducting strips, an average of two strips are affected by an induction signal.

In known detectors in which the amplification gap may be several millimeters, this induction signal would affect a very high number of conducting strips (about 40) which would be harmful to detection of high flows of ionizing particles and the efficiency of these detectors since the induced signal would be shared between a large number of conducting strips.

In practice, it would be necessary to use conducting strips several millimeters wide which would consequently degrade the spatial resolution capacity of these detectors.

Furthermore, in order to obtain a gap of the order of 1 mm between the anode and the cathode with these detectors and for the same multiplication factor, the signal due to positive ions reaches its maximum value within a time interval equal to the ion drift time which may be several tens of microseconds.

In order to reduce the signal rise time, it is then necessary to use fast electronic means that attenuate the signal amplitude.

Attempting to compensate for this effect by increasing the gain brings these detectors close to their spark condition.

On the other hand, this invention can give rise times of the order of 100 ns with an excellent signal/noise ratio and operating under much lower, and therefore much more stable, multiplication conditions.

What is claimed is:

1. Ionizing particle detector comprising:

a gas chamber (2);

first (4), second (6) and third (8) plane electrodes placed in this order in the chamber and kept parallel with each other, the first and second electrodes delimiting a conversion gap (C) in which particles generate electrons, the second and third electrodes delimiting an amplification gap (A) in which said electrons are multiplied by an avalanche process, the second electrode being perforated by holes (18) and forming a cathode (6), the third electrode forming an anode (8) and comprising a set of elementary anodes (14; 29; 14; 19) electrically insulated from each other; and polarization means (10) capable of raising the first electrode (4) to a first potential, the cathode (6) to a second potential, and elementary anodes (14; 29; 14; 19) to a third potential higher than the second potential, said polarization means thus being capable of creating electric fields (E1, E2) in the conversion (C) and amplification (A) gaps respectively, wherein the distance D between the cathode (6) and the anode (8) is less that 500 µm and the ratio R of the intensity of the electric field (E2) created in the amplification gap (A) to the intensity of the electric field (E1) created in the conversion gap (C) exceeds 10, and wherein the detector further comprises means for amplifying and processing electric signals from the elementary anodes when the electrons are multiplied in the amplification gap.

2. Detector according to claim 1, characterized in that the distance D does not exceed 200 µm.

3. Detector according to claim 1, wherein the ratio R is equal to at least 50.

4. Detector according to claim 1, wherein the thickness E of the cathode (6) is less than D/10.

5. Detector according to claim 1, wherein the size T and the pitch P of the holes (18) in the cathode (6) are within the interval varying from D/10 to D/7, the size T being greater than the thickness E and less than the pitch P.

6. Detector according to claim 1, wherein the elementary anodes are electrically conducting strips (14) parallel to each other.

7. Detector according to claim 1, wherein the elementary anodes are electrically conducting elements (29) forming a two-dimensional checker board network.

8. Detector according to claim 1, wherein the elementary anodes are distributed in a first set of electrically conducting strips (14) parallel to each other, and a second set of electrically conducting strips (19) parallel to each other and perpendicular to the strips (14) in the first set, and electrically insulated therefrom.

9. Detector according to claim 1, further comprising electrically insulating spacers (20) for keeping the anode (8) and cathode (6) parallel to each other.

10. Detector according to claim 1, wherein the gas pressure in the chamber (2) exceeds $10^3$ Pa, the electrons generated in the conversion gap (C) resulting from gas being ionized by the particles.

11. Detector according to claim 1, wherein the gas pressure in the chamber (2) is less than $10^3$ Pa, the detector further comprising a layer (34) of material capable of generating electrons in the conversion gap (C) by interaction with ionizing particles, said layer being formed on the first electrode (4) facing the cathode (6).

12. Detector according to claim 1, wherein the size of the elementary anodes is approximately equal to or less than the distance (D) between the cathode and the anode.

* * * * *